Dec. 7, 1948.  C. A. BADEAU ET AL  2,455,641
GROUNDING POLE PLATE
Filed Nov. 28, 1945
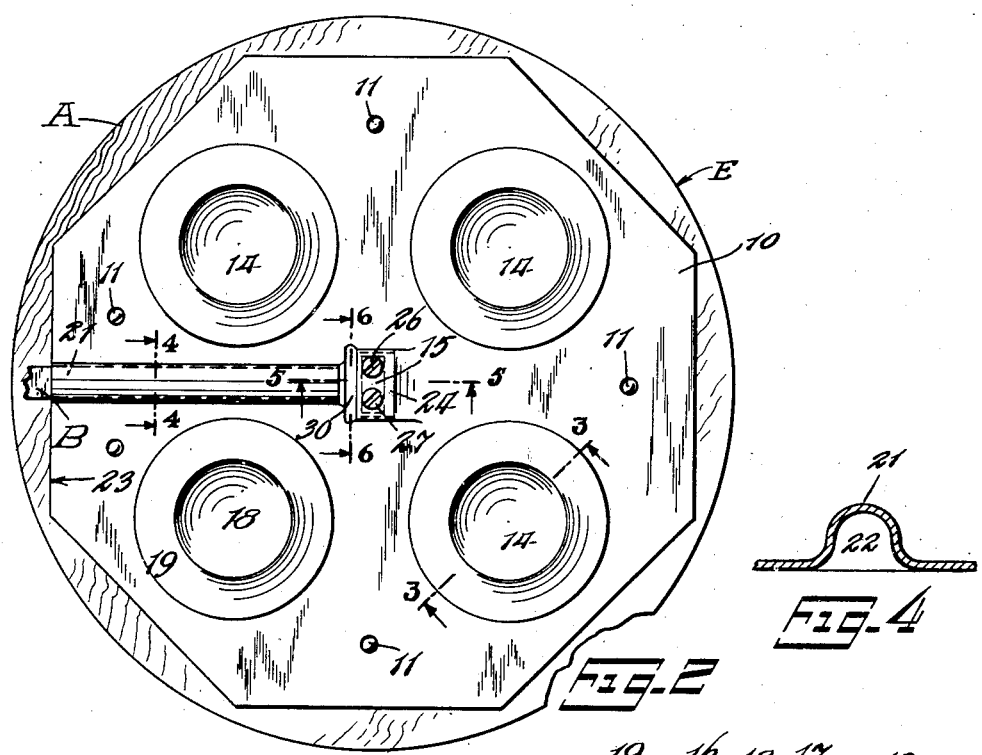
INVENTORS
CARROLL A. BADEAU
JEROME B. CLAPP
Warren S. Orton
ATTORNEY Patented Dec. 7, 1948

2,455,641

UNITED STATES PATENT OFFICE 2,455,641

GROUNDING POLE PLATE

Carroll A. Badeau, Westfield, and Jerome B. Clapp, North Plainfield, N. J., assignors to The Thomas & Betts Co., Elizabeth, N. J., a corporation of New Jersey Application November 28, 1945, Serial No. 631,350

2 Claims. (Cl. 174—6)

The invention relates to a device for grounding electric current carrying wires into the ground at the base of a pole and to a new technic in improving the grounding connections.

The primary object of the invention is to provide for a more effective and positive electric transmitting connection between a ground wire and the earth at the bottom of a pole than is provided by similar grounding devices now known. It has been known, for instance, to secure a flat metallic plate to the bottom of the pole so that the diameter of the plate corresponds to that of the pole and to connect a ground wire thereto in such way that the plate will be thrust into contact with the ground by the weight of the pole. Such forms of grounding plates possess an obvious advantage in that the weight of the pole thereon tends to compact the earth beneath the same and thus assist in forming a grounding contact of extensive area between plate and earth, but it also possesses a disadvantage in that it forms, more or less, a water seal which acts to close the bottom of a wooden pole from the infiltration of water and thus tends to defeat the desirable function of such poles in sucking up and storing moisture from the ground when free of grounding plates.

The present disclosure features the use of a ground plate of less area than the area of the bottom of the pole and thus provides for exposed suction areas at the bottom of the pole disposed to permit the pole to absorb moisture, which moisture is subsequently supplied to the area between the ground wire and plate, as hereinafter described. The disclosure also features for the same purpose the providing of draining and conducting openings through the bottom of the plate, and in this way provides for water conducting passageways without materially limiting the electric transmission area of the grounding plate.

Poles tend to vibrate by reason of the suspended conductors carried thereby, and this sets up a puddling action on the earth surface beneath the pole. Such action of the pole increases the capillary action of the earth with the result that water is pumped to the region at the bottom of the pole even in the absence of any grounding plate.

The invention has for its major object the providing for an increase in this puddling action to insure a supply of moisture present at the bottom of the pole and on both sides of the grounding plate herein featured.

Broadly, this objective is attained by providing the grounding plate with one or more downwardly facing suction cups arranged to concentrate the total pressure on the plate on several relatively smaller surfaces of the earth beneath the pole, and by such concentration of pressure to increase the capillary action of the earth at the selected areas and so draw moisture from the earth to the area immediately beneath the plate and pole.

Various other objects and advantages of the invention will be in part obvious from an inspection of the accompanying drawings, and in part will be more fully set forth in the following particular descriptions of one form of the grounding pole plate embodying the invention, and the invention also consists in certain new and novel features of construction and combination of parts hereinafter set forth and claimed.

In the drawings:

Figure 1 is a view in side elevation of a pole intruded into the ground and provided with a ground wire of conventional form and with a ground plate constituting a preferred embodiment of the invention;

Figure 2 is an enlarged plan view of the under side of the plate and pole shown in Figure 1 as shown when looking upwardly at the end of the assembly; and Figures 3, 4, 5 and 6 are transverse sectional views taken respectively on the planes indicated by the lines 3—3, 4—4, 5—5 and 6—6 of Figure 2 with the parts shown in reverse position, that is with the embossments projecting upwardly before the plate is reversed and secured to the pole.

In the drawings there is shown a wooden electric transmission power pole A having its lower end of conventional cylindrical form, to the side of which is secured conventionally a ground wire or flat ground strap B, both having their lower ends sunk into a hole C in the ground D as is usual with such pole mountings.

The grounding device includes a ground plate 10 the flat portions of which are secured to the bottom of the pole by means of nails passed through nail holes 11 provided in the plate and which nails are driven into the bottom of the pole as usual in fastening such plates in position. These holes, even when partly closed by their associated nails, constitute moisture drain vents to permit the passage of water from one to the other side of the plate in whichever direction of flow will tend to equalize the moisture content on opposite sides of the plate. Nails may be omitted from some of the holes 11 if desired to increase the passageway areas.

The plate is of octagonal form, and its maximum diameter is less than that of the pole to which it is fitted so as to leave peripheral portions E of the sawed-off pole bottom exposed directly to the earth at the bottom of the hole and in position to absorb the moisture fed into the imbedded lower portion of the pole.

The plate is simply a sheet of metal having a high degree of electric conductivity and is reinforced by the embossments hereinafter described, and may be made of extremely thin stock sheet metal, such as copper.

The plate is subjected to a die pressing operation to provide four annular embossments 14 arranged with their centers equi-distantly spaced apart about the center 15 of the plate, and in this way tend to distribute strains equally about all portions of the plate. These embossments form four downwardly facing recesses constituting annular suction cups 16 when in position as shown in Figure 1. As more particularly shown in Figure 3 when considered upside-down, each embossment forms a central semispherical cup 16 which faces downwardly and is outlined by a dome-forming pressure wall 17 concaved on its under side where it bears under high pressure on the earth beneath the same. The crown point 18 of the concaved wall 17 is in the plane of the unembossed flat portion of the plate and is the point where trapped air is most apt to accumulate.

The wall 17 rounds downwardly and upwardly into an endless rim 19 which is convex on its under side and rounds at its outer perimeter 20 into the flat portion of the plate. It is seen from this construction that downward pressure on the plate in the vicinity of the cups and considered within the circle defined by the perimeter 20 is in effect confined to the area of the cups 16, and the loci of all the vertical pressure lines within the cup is in effect concentrated on the line passing vertically through the point 18.

The plate is also embossed to provide a radially disposed hollow rib or corrugation 21 forming an upwardly facing open channel 22 extending radially from one edge 23 of the plate toward its center 15, as shown in Figure 2. At its inner end the rib is enlarged to form a flat bottom 24 defining the bottom of a clutch containing space 25. A pair of screws 26 and 27 is passed through the bottom 24 of the clamping space and have their upper ends in threaded engagement with a floating clamping plate 28 coacting with the bottom to form a clamp for engaging the flat inturned terminal end 29 of the ground wire B passed between the screws as shown in Figure 6. The bottom 24 is provided with a transverse opening 30 just in front of the clamp to permit passage of earth into the tunnel and to permit moisture to move into and from the tunnel while the device is in use.

In operation the plate having been secured to the bottom of the pole, as by nailing, the lower end of the pole with the plate is let down into the hole C provided therefor, and the hole filled in and tamped following conventional practices in this respect. The weight of the pole with its associated wires and other attachments thereon forces the plate downwardly, and by reaction the moist earth is forced upwardly into the four suction cups. Most of the air trapped in the domes 16 escapes, and the remaining accumulates therein above the level of the earth and forms dead air cushioning spaces. Eventually, the pole settles into a more or less set position at a prefixed elevation.

The weight of the pole is, of course, distributed more or less evenly across the entire horizontal area of the grounding plate. The downward pressure of the pole acts on the semi-liquid earth to cause the same to be pushed up into the suction cups so that the aggregate contact surface between earth and plate is greater than the horizontal surface of the plate if it were entirely flat.

The reactory pressure of the earth on the dome-forming wall 17 at any one point thereon is acting radially upwardly and outwardly and at right angles to the wall at any such selected point. This has the effect of balancing forces about the vertical line passing through the point 18 and thus tends to avoid collapsing of the domes even though during use the rocking of the plate may tend to distort it.

During a rainy spell, the water contents of the earth about the pole increases; the water percolates upwardly therefrom into the lower sawed-off end of the pole, the water passing both about the edges of the plate as well as through the openings 11 and 30 provided in the plate. The presence of this moisture, of course, increases the conductivity between the ground and both the ground wire and plate.

As the plate swings and vibrates back and forth with the pole, the suction cups exert a puddling effect on the more or less compacted moist earth at the bottom of the pole, which tend not only to draw water by capillary action from the surrounding earth toward the plate, but also forces the water upwardly through the plate and into the lower end of the pole, which thus becomes a reservoir of water available to keep both sides of the plate wet during any succeeding dry spell.

We claim:

1. A sheet metal ground plate for the bottom of a pole, said plate having a flat portion providing an upper surface fashioned for engagement with the bottom of the pole, said plate provided with a plurality of semi-spherical embossments circularly spaced apart radially of the center of the plate, each of said embossments projecting downwardly from the flat portion, forming at its center a downwardly facing semispherical cup forming an arched dome outlined by an annular upwardly facing rim, each of said rims being surrounded by a part of the flat portion of the plate, each embossment being continuous across its entire area and thus free of openings therethrough, and said plate at its flat pole-engaging portion provided with means for securing the plate to the pole.

2. The plate defined in claim 1 and in which a portion of the plate in the area between two of the spherical embossments is additionally embossed downwardly from the flat pole-engaging portion to form a radially disposed corrugation forming an upwardly facing open channel extending radially from an edge of the plate towards its center and wire clamping means at the inner end of the channel located downwardly offset from the upper pole-engaging surface of the plate.

CARROLL A. BADEAU.
JEROME B. CLAPP.

REFERENCES CITED

The following references are of record in the file of this patent:

UNITED STATES PATENTS

| Number | Name | Date |
| --- | --- | --- |
| 284,082 | Spang | Aug. 28, 1883 |
| 314,367 | Cook | Mar. 24, 1885 |
| 1,342,645 | Pendell | June 8, 1920 |
| 1,681,644 | Maple | Aug. 21, 1928 |
| 2,303,861 | Pennell | Dec. 1, 1942 |
| 2,308,528 | Luecke | Jan. 19, 1943 |